United States Patent
Wells

(10) Patent No.: US 6,571,656 B1
(45) Date of Patent: Jun. 3, 2003

(54) PORTABLE HAND CONTROL SYSTEM

(76) Inventor: Phillip L. Wells, 8419 Oak View Dr., Chattanooga, TN (US) 37421

( * ) Notice: Subject to any disclaimer, the term of this patent is extended or adjusted under 35 U.S.C. 154(b) by 0 days.

(21) Appl. No.: 09/853,492

(22) Filed: May 11, 2001

(51) Int. Cl.[7] .............................................. B60K 41/20
(52) U.S. Cl. ........................................ 74/482; 477/209
(58) Field of Search ................... 74/481, 482; 477/209; 254/DIG. 5

(56) References Cited

U.S. PATENT DOCUMENTS

| | | | | |
|---|---|---|---|---|
| 2,602,348 A | * | 7/1952 | Wilson | 477/209 |
| 3,533,305 A | * | 10/1970 | Hill | 74/551.3 |
| 4,424,723 A | | 1/1984 | Gockel | |
| 4,788,879 A | | 12/1988 | Ulrich | |
| 5,119,688 A | | 6/1992 | Snyder | |
| 5,323,889 A | * | 6/1994 | Bednarek | 254/DIG. 5 |
| D364,839 S | | 12/1995 | Peters | |
| 5,542,312 A | | 8/1996 | Peters | |
| 5,709,131 A | * | 1/1998 | Gummery | 477/209 |
| 5,765,442 A | | 6/1998 | Judson | |

FOREIGN PATENT DOCUMENTS

JP          9-267666      * 10/1997

* cited by examiner

*Primary Examiner*—David A. Bucci
*Assistant Examiner*—Timothy McAnulty

(57) ABSTRACT

A portable hand control system for operating an accelerator and brake pedal of a vehicle by hand. The portable hand control system includes an accelerator control rod releaseably couplable to the accelerator pedal of the vehicle and a brake control rod releaseably couplable to the brake pedal of the vehicle. A thumb control is mounted on the accelerator control rod for selectively receiving a thumb of a user controlling the accelerator control rod. A handle is mounted the brake control rod selectively receiving a hand of a user controlling the brake control rod. A coupling member is mounted on the brake control rod for operationally coupling the accelerator control rod to the brake control rod. A quick release coupling system is provided for coupling the accelerator control rod to the accelerator pedal of the vehicle and for coupling the brake control rod to the brake pedal of the vehicle.

17 Claims, 4 Drawing Sheets

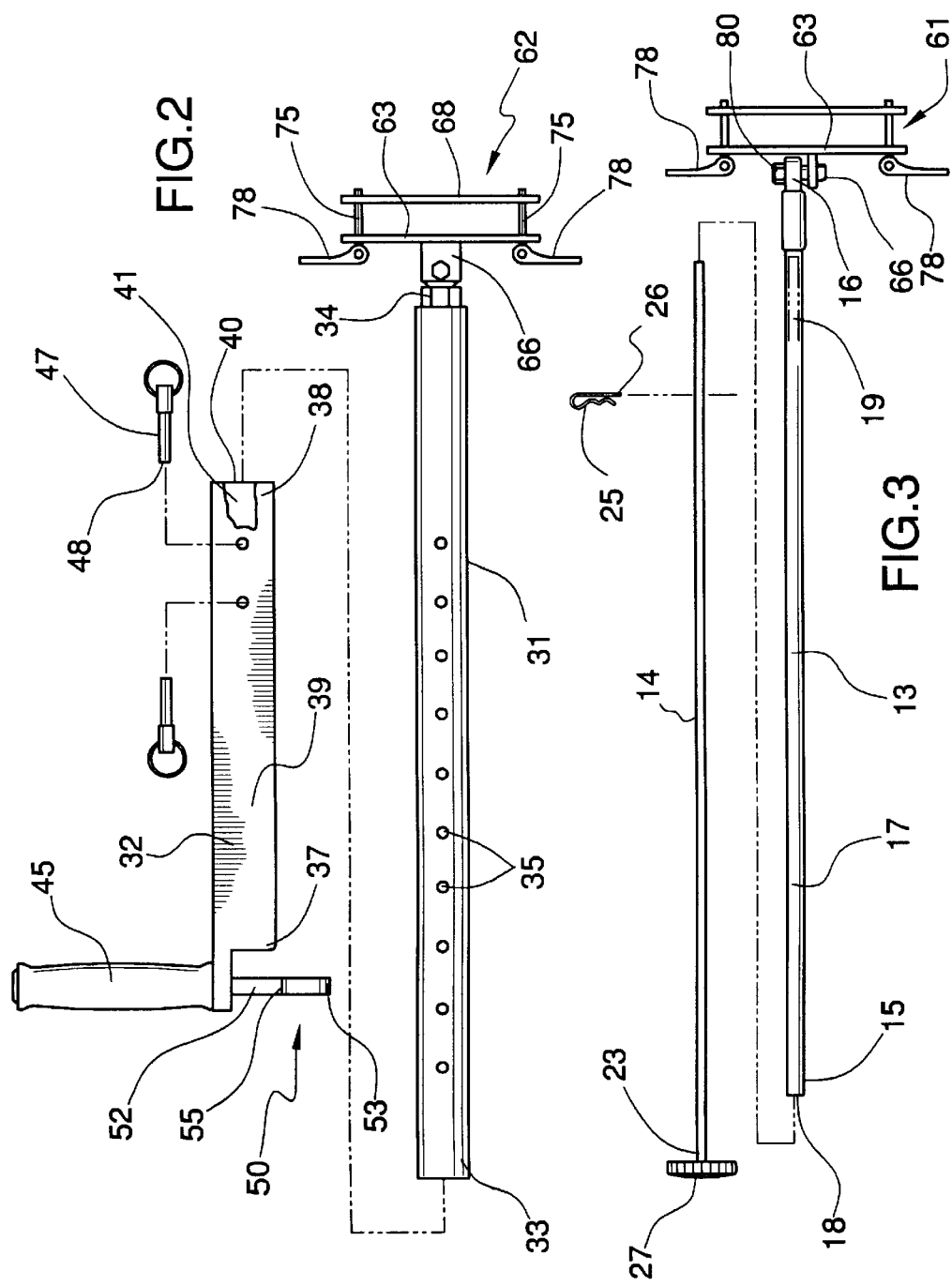

PORTABLE HAND CONTROL SYSTEM

BACKGROUND OF THE INVENTION

1. Field of the Invention

The present invention relates to hand controls and more particularly pertains to a new portable hand control system for operating an accelerator and brake pedal of a vehicle by hand.

2. Description of the Prior Art

The use of hand controls is known in the prior art. More specifically, hand controls heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,765,442; U.S. Pat. No. 5,542,312; U.S. Pat. No. 5,119,688; U.S. Pat. No. 4,424,723; U.S. Pat. No. Des. 364,839; and U.S. Pat. No. 4,788,879.

While these devices fulfill their respective, particular objectives and requirements, the aforementioned patents do not disclose a new portable hand control system. The inventive device includes an accelerator control rod that is releaseably couplable to the accelerator pedal of the vehicle and a brake control rod that is releaseably couplable to the brake of the vehicle. A thumb control is mounted on the accelerator control rod for selectively receiving a thumb of a user controlling the accelerator control rod. A handle is mounted the brake control rod selectively receiving a hand of a user controlling the brake control rod. A coupling member is mounted on the brake control rod for operationally coupling the accelerator control rod to the brake control rod. A quick release coupling system is provided for coupling the accelerator control rod to the accelerator pedal of the vehicle and for coupling the brake control rod to the brake pedal of the vehicle.

In these respects, the portable hand control system according to the present invention substantially departs from the conventional concepts and designs of the prior art, and in so doing provides an apparatus primarily developed for the purpose of operating an accelerator and brake pedal of a vehicle by hand.

SUMMARY OF THE INVENTION

In view of the foregoing disadvantages inherent in the known types of hand controls now present in the prior art, the present invention provides a new portable hand control system construction wherein the same can be utilized for operating an accelerator and brake pedal of a vehicle by hand.

The general purpose of the present invention, which will be described subsequently in greater detail, is to provide a new portable hand control system apparatus and method which has many of the advantages of the hand controls mentioned heretofore and many novel features that result in a new portable hand control system which is not anticipated, rendered obvious, suggested, or even implied by any of the prior art hand controls, either alone or in any combination thereof.

To attain this, the present invention generally comprises an accelerator control rod that is releaseably couplable to the accelerator pedal of the vehicle and a brake control rod that is releaseably couplable to the brake of the vehicle. A thumb control is mounted on the accelerator control rod for selectively receiving a thumb of a user controlling the accelerator control rod. A handle is mounted the brake control rod selectively receiving a hand of a user controlling the brake control rod. A coupling member is mounted on the brake control rod for operationally coupling the accelerator control rod to the brake control rod. A quick release coupling system is provided for coupling the accelerator control rod to the accelerator pedal of the vehicle and for coupling the brake control rod to the brake pedal of the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable hand control system apparatus and method which has many of the advantages of the hand controls mentioned heretofore and many novel features that result in a new portable hand control system which is not anticipated, rendered obvious, suggested, or even implied by any of the prior art hand controls, either alone or in any combination thereof.

It is another object of the present invention to provide a new portable hand control system which may be easily and efficiently manufactured and marketed.

It is a further object of the present invention to provide a new portable hand control system which is of a durable and reliable construction.

An even further object of the present invention is to provide a new portable hand control system which is susceptible of a low cost of manufacture with regard to both materials and labor, and which accordingly is then susceptible of low prices of sale to the consuming public, thereby making such portable hand control system economically available to the buying public.

Still yet another object of the present invention is to provide a new portable hand control system which provides in the apparatuses and methods of the prior art some of the advantages thereof, while simultaneously overcoming some of the disadvantages normally associated therewith.

Still another object of the present invention is to provide a new portable hand control system for operating an accelerator and brake pedal of a vehicle by hand.

Yet another object of the present invention is to provide a new portable hand control system which includes an accelerator control rod that is releaseably couplable to the accelerator pedal of the vehicle and a brake control rod that is releaseably couplable to the brake of the vehicle. A thumb control is mounted on the accelerator control rod for selectively receiving a thumb of a user controlling the accelerator control rod. A handle is mounted the brake control rod selectively receiving a hand of a user controlling the brake control rod. A coupling member is mounted on the brake control rod for operationally coupling the accelerator control rod to the brake control rod. A quick release coupling system is provided for coupling the accelerator control rod to the accelerator pedal of the vehicle and for coupling the brake control rod to the brake pedal of the vehicle.

Still yet another object of the present invention is to provide a new portable hand control system that, unlike the prior art which is time consuming to place hand controls in a vehicle, that employs a quick coupling assembly that allows it to be quickly and easily transportable between different vehicles.

Even still another object of the present invention is to provide a new portable hand control system that aids users with physically disabled or temporarily injured legs to operate a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic top view of the present invention.

FIG. 3 is a schematic top view of the present invention.

DESCRIPTION OF THE PREFERRED EMBODIMENT

Figure 1:
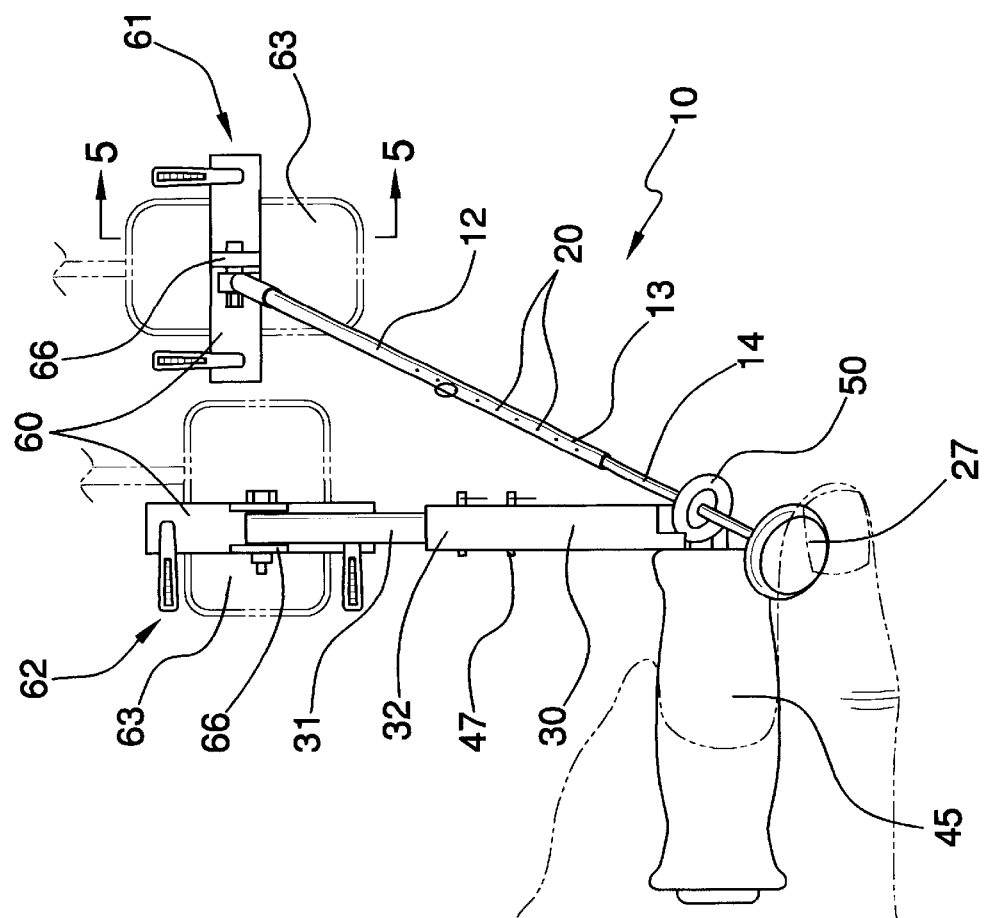
FIG. 1 is a schematic perspective view of a new portable hand control system according to the present invention.

With reference now to the drawings, and in particular to FIGS. 1 through 5 thereof, a new portable hand control system embodying the principles and concepts of the present invention and generally designated by the reference numeral 10 will be described.

As best illustrated in FIGS. 1 through 5, the portable hand control system 10 generally comprises an accelerator control rod 12 that is releaseably couplable to the accelerator pedal of the vehicle and a brake control rod 30 that is releaseably couplable to the brake pedal of the vehicle. A quick release coupling system 60 is provided for quickly coupling the accelerator 12 and brake 30 control rods to the accelerator and brake pedals.

As illustrated in FIG. 3, the accelerator control rod 12 may include a first accelerator rod portion 13 and a second accelerator rod portion 14. The first accelerator rod portion 13 may be telescopingly engaged to the second accelerator rod portion for adjusting a length of the accelerator control rod 12.

The first accelerator rod portion 13 may include a first end 15, a second end 16 and a peripheral wall 17 extending between the first 15 and second 16 ends of the first accelerator rod portion 13. The first end 15 of the first accelerator rod portion 13 may include an opening 18 extending into a channel 19 in the first accelerator rod portion 13.

The peripheral wall 17 of the first accelerator rod portion 13 may include a plurality of holes 20 extending through the peripheral wall 17. Each of the holes 20 is preferably spaced apart from each other along a longitudinal axis of the first accelerator rod portion 13.

The first accelerator rod portion 13 may be generally circular such that the first accelerator rod portion 13 includes a substantially circular transverse cross section taken perpendicular to a longitudinal axis of the first accelerator rod portion 13.

The first accelerator rod portion 13 may comprise a substantially rigid material such as for example, a steel, aluminum or plastic material. Other materials may also be employed in the manufacturing of the first accelerator rod portion 13.

The second accelerator rod portion 14 may include a first end 23 and a second end 24. The second end 24 of the second accelerator rod portion 14 may be telescopingly positioned in the channel 19 extending into the first accelerator rod portion 13 and selectively engaged thereto. The second acceleration rod portion 14 may comprise a substantially rigid material such as, for example, a steel, aluminum or plastic material.

A fastening means 25 may be provided for fastening the first accelerator rod portion 13 with respect to the second accelerator rod portion 14. An end 26 of the fastening means 25 may be removably extendable through one of the holes 20 in the peripheral wall. 17 of the first accelerator rod portion 13 and through a portion of the second accelerator rod portion 14. The length of the accelerator control rod 12 is adjusted by sliding the first 13 and second 14 accelerator rod portions with respect to each other.

The fastening means 25 may comprise a pin or any other type of fastening means capable of allowing a user to quickly change the length of the accelerator control rod 12.

A thumb control 27 is provided for selectively receiving a thumb of a user controlling the accelerator control rod 12. The thumb control 27 may be mounted on the first end 23 of the second accelerator rod:portion 14. The thumb control 27 may include a substantially circular disc shape for easier operation of the accelerator control rod 12 by the thumb of the user.

Figure 4:
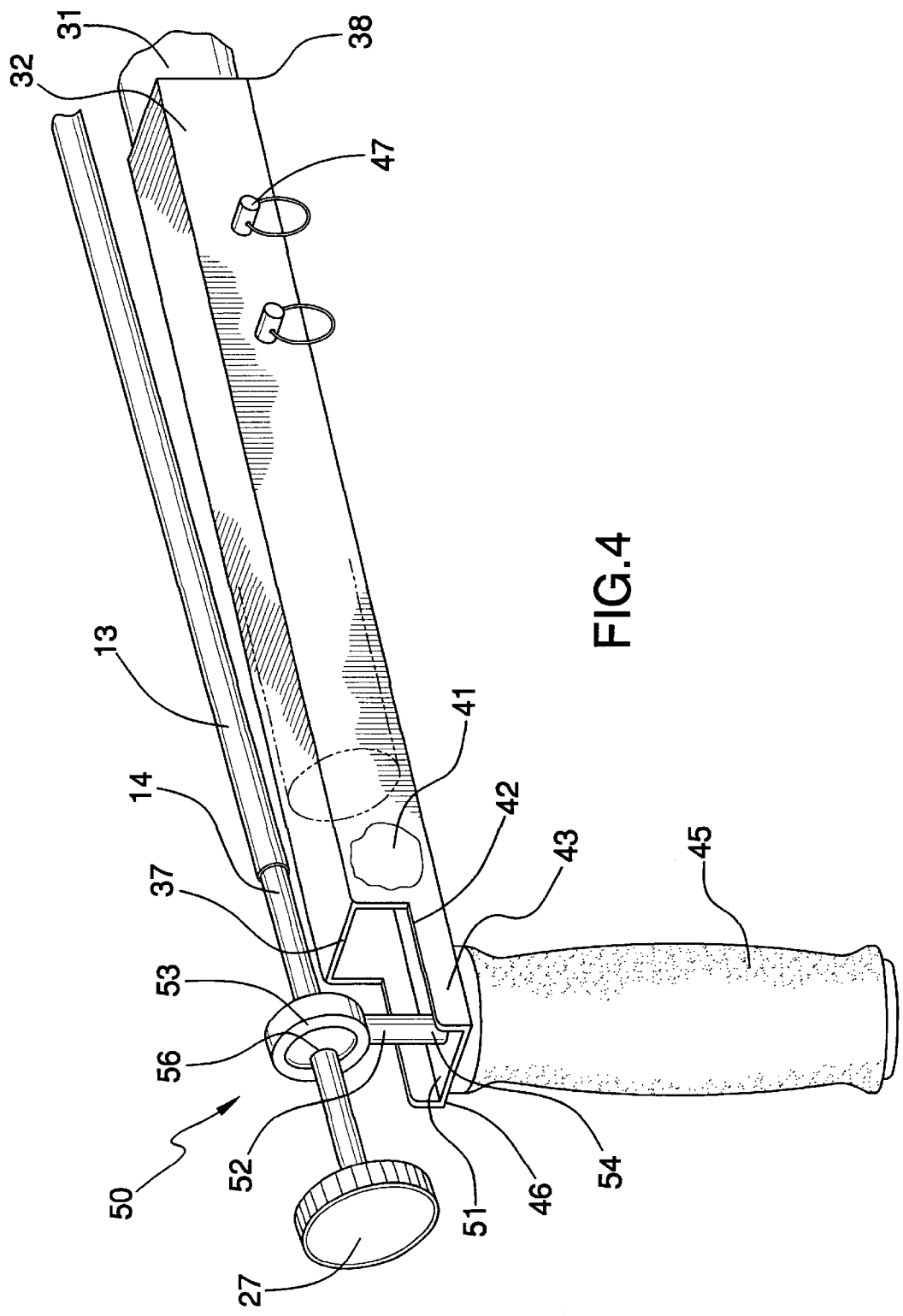
FIG. 4 is a schematic perspective view of the present invention.

As illustrated in FIGS. 1 and 4, the brake control rod 30 is preferably operationally coupled to the accelerator control rod 12 for providing easier operation of the portable hand control system 10. As particularly illustrated in FIG. 2, the brake control rod 30 may include a first brake rod portion 31 and a second brake rod portion 32. The first brake rod portion 31 may be telescopingly engaged to the second brake rod portion 32 for adjusting a length of the brake control rod 30.

The first brake rod portion 31 may include a first end 33 and a second end 34. The first brake rod portion 31 may include a plurality of holes 35 extending through the first brake rod portion 31. Each of the holes 35 may be spaced apart from each other between the first 33 and second 34 ends of the first brake rod portion 31.

The first brake rod portion 31 may be generally circular such that the first brake rod portion 31 may include a generally circular transverse cross section taken substantially perpendicular to a longitudinal axis of the first brake rod portion 31. However, the first brake rod portion 31 may employ other transverse cross sectional shapes.

The second brake rod portion 32 may include -a first end 37, a second end 38 and a peripheral wall 39 extending between the first 37 and second 38 ends of the second brake rod portion 32. The second end 38 of the second brake rod portion 32 may include an aperture 40 extending into a channel 41 in the second brake rod portion 32.

The first end 37 of the second brake rod portion 32 may include a notch 42 extending therein such that a tab 43 is formed extending beyond the first end 37 of the second brake rod portion 37.

The second brake rod portion 32 is preferably generally square such that the second brake rod portion 32 includes a generally square transverse cross-section taken substantially perpendicular to a longitudinal axis of the second brake rod portion 32.

The first end 33 of the first brake rod portion 31 may be positioned in. the channel 41 extending in the second end 38 of the second brake rod portion 32 and may be telescopingly engaged to the second brake rod portion 32. The first 31 and second 32 brake rod portion may comprise a substantially rigid material such as, for example, a steel, aluminum or plastic material.

A handle 45 is mounted on an outer surface 46 of the tab 43 of the second brake rod portion 32 for operating the brake control rod 30. The handle 45 is positioned generally adjacent to the second end 37 of the second brake rod portion 32. The handle 45 may be orientated generally perpendicular to the longitudinal axis of the second brake rod portion 32. The handle 45 may include an absorbent outer covering member for gripping by the hand of the user.

A securing means 47 may be provided for securing the first brake rod portion 31 to the second brake rod portion 32. An end 48 of the securing means 47 may be removably extendable through the peripheral wall 39 of the second brake rod portion 32 and extendable through one of the holes 35 in the first brake rod portion 31. A longitudinal axis of the securing means 47 may be orientated generally parallel to a longitudinal axis of the handle 45. The securing means 47 may comprise at least one pin. However, other types of securing means may be employed.

As illustrated in FIGS. 2 and 4, a coupling member 50 is mounted on an inner surface 51 of the tab 43 of the second brake rod portion 32 for operationally coupling the accelerator control rod 12 to the brake control rod 30. The coupling member 50 may include a post portion 52 and an annular portion 53.

The post portion 52 may include a first end 54 and a second end 55. The first end 54 of the post portion 52 may be coupled to the inner surface 51 of the tab 43 of the second brake rod portion 32. The post portion 52 of the coupling member 50 may be axially aligned with the handle 45.

The post portion 52 of the coupling member 50 preferably includes a length generally greater than a transverse cross section of the second brake rod portion 32 taken substantially perpendicular to the longitudinal axis of the of the second brake rod portion 32.

The annular portion 53 may be mounted on the second end 55 of the post portion 52. The annular portion 53 preferably includes an aperture 56 extending through the annular portion 53. An axis extending through the aperture 56 of the annular member is preferably orientated generally parallel to the longitudinal axis of the second brake rod portion 32.

The second accelerator rod portion 14 of the accelerator control rod 12 is positioned in the aperture 56 of the annular portion 53 such that the thumb control 27 is positioned generally adjacent to the handle 45.

Figure 5:
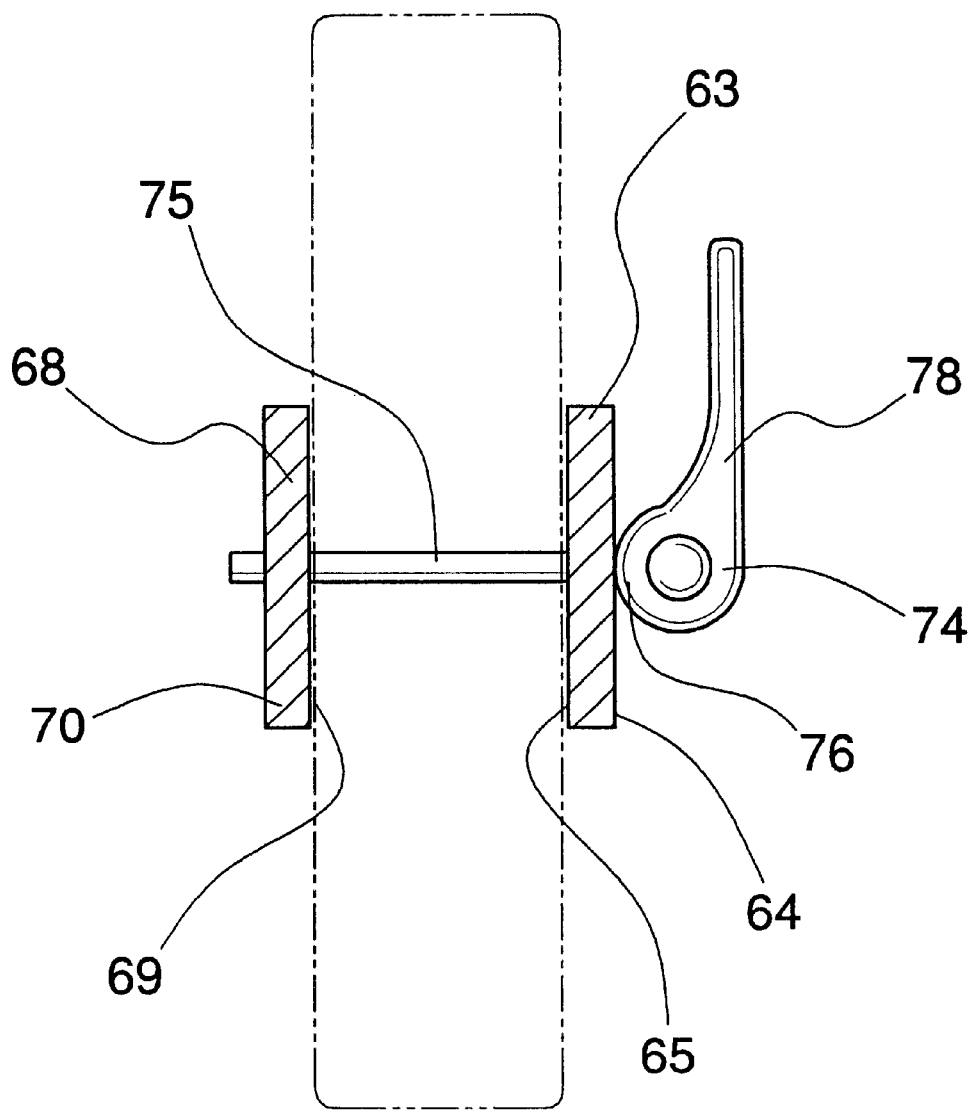
FIG. 5 is a schematic cross-sectional view of the present invention taken along line 5—5 of FIG. 1.

As illustrated in FIGS. 1, 2 and 5, the quick release coupling system 60 may comprise a first coupling assembly 61 for coupling the first accelerator rod portion 13 of the accelerator control rod 12 to the accelerator pedal of the vehicle and a second coupling assembly 62 for coupling the first brake rod portion 31 of the brake control rod 30 to the brake pedal of the vehicle.

The first 61 and second 62 coupling assemblies may include a first plate 63 that includes an upper 64 and lower 65 surfaces. The upper surface 64 of the first plate 63 may include at least one tab 66 formed thereon. The lower surface 65 of the first plate 63 is selectively abuttable against a first surface of the accelerator or brake pedal.

The first 61 and second 62 coupling assemblies may also include a second plate 68 that includes an upper 69 and lower 70 surfaces. The upper surface 69 of the second plate 68 is selectively abuttable against a second surface of the accelerator and brake pedals. The first 63 and second 68 plates may comprise a substantially rigid material such as, for example, a steel, aluminum or plastic material.

A fastening means 74 may be provided for fastening the first plate 63 to the second plate 68. The fastening means 74 preferably extends between and is coupled to the first 63 and second 68 plates. The fastening means 74 may include a rod portion 75 that is mounted on the second plate 68 with an end 76 of the rod portion 75 extending through the first plate 63.

The fastening means 74 may also include a lever portion 78 that is pivotally mounted on the end 76 of the rod portion 75 of the fastening means 74. The lever portion 78 may be positioned generally adjacent to the first plate 63.

The lever portion 78 of the fastening means 74 may be positionable between a first position and a second position. In one embodiment of the present invention, the first position is characterized by a longitudinal axis of the lever portion 78 being orientated generally perpendicular to the first plate 63. As particularly illustrated in FIG. 5, the second position is characterized by the longitudinal axis of the lever portion 78 being orientated generally parallel to the first plate 63.

In one embodiment of the present invention, the first 63 and second 68 plates are generally closer to each other when the lever portion 78 of the fastening means 74 is in the first position than when the lever portion 78 is in the second position.

The first 63 and second 68 plates are releaseably couplable to the accelerator and brake pedals when the lever portion 78 is in the second position. The second end 16 of the first accelerator rod portion 13 is pivotally coupled to the tab 66 formed on the first plate 63 of the first coupling assembly 61. The second end 34 of the first brake rod portion 31 is pivotally coupled to the tab 66 formed on the first plate 63 of the second coupling assembly 62.

A securing means 80 may be provided for securing the second ends 16 and 34 of the first accelerator rod portion 13 and the first brake rod portion 31 to the tabs 66 formed on the first plate 63 of the first 61 and second 62 coupling assemblies. The securing means 80 may extend through the ends 16 and 34 of the first accelerator rod portion 13 and the first brake rod portion 31 and be may be removably secured to the tab 66 formed on the first plate 63 of the first 61 and second 62 coupling assemblies. The securing means 80 comprise a screw. Other types of securing means such as, for example, a bolt may also be employed.

In use, the first 61 coupling assembly is coupled to the accelerator pedal of the vehicle by positioning the accelerator pedal between the first 63 and second 68 plates of the first coupling assembly 61 and positioning the lever portion 78 of the fastening means 74 from the first position toward the second position. A user may then couple the second coupling assembly 62 to the brake pedal of the vehicle by positioning the brake pedal between the first 63 and second 68 plates of the second coupling assembly 62 and positioning the lever portion 78 of the fastening means 74 from the first position toward the second position.

Once the accelerator control rod 12 and the brake control rod 30 are coupled to the accelerator and brake pedals of the vehicle, a user is then able to control the acceleration and braking of a vehicle with one hand while controlling the steering of the vehicle with the other hand.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described; and accordingly, all suitable modifications and equivalents may be resorted to, falling within the scope of the invention.

I claim:

1. A portable hand control system for operating a brake pedal and an accelerator pedal of a vehicle, said system comprising:

an accelerator control rod for actuating the accelerator pedal of the vehicle, said accelerator control rod being releaseably couplable to the accelerator pedal of the vehicle, said accelerator control rod having an upper end and a lower end;

a thumb control for permitting the actuation of said accelerator control rod by a thumb of a user being mounted on said accelerator control rod;

a brake control rod for actuating the brake pedal of the vehicle being releaseably couplable to the brake pedal of the vehicle, said brake control rod having a top end and a bottom end;

said brake control rod having a first brake rod portion and a second brake rod portion, said second brake rod portion having a first end and a second end, said first end of said second brake rod portion having a notch extending therein such that a tab is formed that extends beyond said first end of said second brake rod portion, a handle mounted on said brake control rod for permitting the actuation of said brake control rod by a hand of the user, a coupling end of said handle being mounted on an outer surface of said tab of said first end of said second brake rod portion;

a coupling member for operationally coupling said accelerator control rod to said brake control rod being mounted on an inner surface of said tab of said first end of said second brake rod portion, said coupling member having an aperture extending therethrough, a central axis of said aperture being angled with respect to a longitudinal axis of said brake control rod, said accelerator control rod being slidably positioned in said aperture such that said accelerator control rod angles away from said brake control rod to facilitate dimensional spacing of said lower and bottom ends of said accelerator and said brake control rods respectively equal to spacing of the respective pedals of the vehicle, and also facilitates positioning of said thumb control adjacent to said coupling end of said handle while decreasing an amount of force required to actuate said thumb member due to said accelerator control rod being angled with respect to said brake control rod;

wherein said handle and said coupling member are generally coaxial and are positioned adjacent to a distal end of said tab such that said thumb control is positioned adjacent to said coupling end of said handle to facilitate the activation of the accelerator pedal; and a quick release coupling system for coupling said accelerator control rod to the accelerator of the vehicle and for coupling said brake control rod to the brake pedal of the vehicle.

2. The portable hand control system of claim 1, wherein said accelerator control rod has a first accelerator rod portion and a second accelerator rod portion, said first and second accelerator rod portions being telescopingly engaged.

3. The portable hand control system of claim 2, wherein said first accelerator rod portion has a first end, a second end and a peripheral wall extending between said first and second ends of said first accelerator rod portion, said first end of said second accelerator rod portion having an opening extending into a channel in said first accelerator rod portion, a second end of said second accelerator rod portion being telescopingly positioned in said channel and selectively engaged thereto.

4. The portable hand control system of claim 3, wherein said peripheral wall of said first accelerator rod portion has a plurality of holes extending therethrough, each of said holes being spaced apart from each other along a longitudinal axis of said first accelerator rod portion.

5. The portable hand control system of claim 4, additionally including a fastening means for fastening said first accelerator rod portion with respect to said second accelerator rod portion, an end of said fastening means being removably extendable through one of said holes in said peripheral wall of said first accelerator rod portion and through a portion of said second accelerator rod portion.

6. The portable hand control system of claim 2, wherein said thumb control is mounted on a first end of said second accelerator rod portion.

7. The portable hand control system of claim 1, wherein said first and second brake rod portions are telescopically engaged.

8. The portable hand control system of claim 7, wherein said first brake rod portion has a plurality of holes extending through said second brake rod portion, each of said holes being spaced apart from each other along a longitudinal axis of said first brake rod portion.

9. The portable hand control system of claim 7, wherein a peripheral wall extends between said first and second ends of said second brake rod portion, said second end of said second brake rod portion having an aperture extending into a channel in said second brake rod portion, a first end of said first brake rod portion being telescopingly positioned in said channel in said second end of said second brake rod portion and engaged thereto.

10. The portable hand control system of claim 9, additionally including a securing means for securing said first brake rod portion with respect to said second brake rod portion, an end of said securing means being removably extendable through said peripheral wall of said second brake rod portion and through one of said holes in said first brake rod portion.

11. The portable hand control system of claim 7, wherein said second brake rod portion is generally square such that said second brake rod portion having a generally square transverse cross-section taken substantially perpendicular to a longitudinal axis of said second brake rod portion.

12. The portable hand control system of claim 1, wherein said coupling member includes a post portion and an annular portion, said post portion being coupled to said inner surface of said tab of said second brake rod portion, said annular portion being mounted on an end of said post portion, said aperture of said coupling member being centrally disposed in said annular portion.

13. A portable hand control system for operating a brake and accelerator pedal of a vehicle, said system comprising:
  an accelerator control rod being releaseably couplable to the accelerator pedal of the vehicle;
  a brake control rod being releaseably couplable to the brake of the vehicle for controlling the brake of the vehicle;
  a thumb control being mounted on said accelerator control rod for selectively receiving a thumb of a user controlling said accelerator control rod;
  a handle being mounted on said brake control rod for selectively receiving a hand of a user controlling said brake control rod;
  a coupling member being mounted on said brake control rod for operationally coupling said accelerator control rod to said brake control rod; and
  a quick release coupling system for coupling said accelerator control rod to the accelerator of the vehicle and for coupling said brake control rod to the brake of the vehicle;
  wherein said quick release coupling system comprises a first coupling assembly for removably coupling a first accelerator rod portion of said accelerator control rod to the accelerator pedal of the vehicle and a second coupling assembly for removably coupling a first brake rod portion of said brake control rod to the brake pedal of the vehicle;
  wherein each of said first and second coupling assemblies includes:
    a first plate and a second plate for selectively abutting against opposite sides of the respective accelerator and brake pedals,
    fastening means for fastening said first plate to said second plate, said fastening means extending between said first and second plates and adjusting a distance between the first and second plates to thereby press said plates against opposite sides of the respective pedal, the fastening means including a lever that increases and decreases the distance between said first and second plates as the lever is pivoted with respect to the plates for mounting and dismounting the plates on the respective pedal.

14. The portable hand control system of claim 13, wherein said lever has a first position extending substantially parallel to one of said plates, and a portion of said lever extends beyond a perimeter of said one of said plates for facilitating actuation of said lever by minimizing interference by said one of said plates.

15. The portable hand control system of claim 13, wherein said fastening means includes a rod portion being mounted on said second plate, an end of said rod portion extending through said first plate, said lever being pivotally mounted on an end of said rod portion of said fastening means, said lever being positioned generally adjacent to said first plate.

16. The portable hand control system of claim 13, wherein said lever of said fastening means is movable between a first position and a second position, wherein said first position is characterized by a longitudinal axis of said lever being orientated generally perpendicular to said first plate, wherein said second position is characterized by said longitudinal axis of said lever being orientated generally parallel to said first plate.

17. A portable hand control system for operating a brake pedal and an accelerator pedal of a vehicle, said system comprising:
  an accelerator control rod for actuating the accelerator pedal of the a vehicle, said accelerator control rod being releaseably couplable to the accelerator pedal of the vehicle, said accelerator control rod having an upper end and a lower end;
  said accelerator control rod having a first accelerator rod portion and a second accelerator rod portion, said first accelerator rod portion being telescopingly engaged with said second accelerator rod portion;
  said first accelerator rod portion having a first end, a second end and a peripheral wall extending between said first and second ends of said first accelerator rod portion, said first end of said second accelerator rod portion having an opening extending into a channel in said first accelerator rod portion;
  said peripheral wall of said first accelerator rod portion having a plurality of holes extending therethrough, each of said holes being spaced apart from each other along a longitudinal axis of said first accelerator rod portion;
  said first accelerator rod portion being generally circular such that said first accelerator rod portion having a substantially circular transverse cross section taken perpendicular to a longitudinal axis of said first accelerator rod portion;
  said first accelerator rod portion comprising a substantially rigid material;
  said second accelerator rod portion having a first end and a second end, said second end of said second accelerator rod portion being telescopingly positioned in said channel in said first accelerator rod portion and selectively engaged thereto;
  a fastening means for fastening said first accelerator rod portion with respect to said second accelerator rod portion, an end of said fastening means being removably extendable through one of said holes in said peripheral wall of said first accelerator rod portion and through a portion of said second accelerator rod portion;

said fastening means comprising a pin;

a thumb control for permitting the actuation of said accelerator control rod by a thumb of a user being mounted on said accelerator control rod, said thumb control having a substantially circular disc shape;

a brake control rod for actuating the brake pedal of the vehicle being releaseably couplable to the brake pedal of the vehicle, said brake control rod having a top end and a bottom end;

said brake control rod having a first brake rod portion and a second brake rod portion, said second brake rod portion having a first end and a second end, said first end of said second brake rod portion having a notch extending therein such that a tab is formed that extends beyond said first end of said second brake rod portion, said brake control rod being operationally coupled to said accelerator control rod, said first and second brake rod portions being telescopingly engaged;

said first brake rod portion having a plurality of holes extending through said second brake rod portion, each of said holes being spaced apart from each other between said first and second ends of said first brake rod portion;

said first brake rod portion being generally circular such that said first brake rod portion having a generally circular transverse cross section taken substantially perpendicular to a longitudinal axis of said first brake rod portion;

said second brake rod portion having peripheral wall extending between said first and second ends of said second brake rod portion, said first end of said second brake rod portion having an aperture extending into a channel in said second brake rod portion;

said second brake rod portion being generally square such that said second brake rod portion having a generally square transverse cross-section taken substantially perpendicular to a longitudinal axis of said second brake rod portion;

said first end of said first brake rod portion being telescopingly positioned in said channel in said second end of said second brake rod portion and engaged thereto;

a handle for permitting the actuation of said brake control rod by a hand of the user being mounted on said brake control rod, a coupling end of said handle being mounted on an outer surface of said tab of said first end of said second brake rod portion;

a securing means for securing said first brake rod portion with respect to said second brake rod portion, an end of said securing means being removably extendable through said peripheral wall of said second brake rod portion and through one of said holes in said first brake rod portion, a longitudinal axis of said securing means being orientated generally parallel to a longitudinal axis of said handle;

said securing means comprising a pin;

a coupling member for operationally coupling said accelerator control rod to said brake control rod being mounted on an inner surface of said tab of said first end of said second brake rod portion, said coupling member having an aperture extending therethrough, a central axis of said aperture being angled with respect to a longitudinal axis of said brake control rod, said accelerator control rod being slidably positioned in said aperture such that said accelerator control rod angles away from said brake control rod to facilitate dimensional spacing of said lower and bottom ends of said accelerator and said brake control rods respectively equal to spacing of the respective pedals of the vehicle, and also facilitates positioning of said thumb control adjacent to said coupling end of said handle while decreasing an amount of force required to actuate said thumb member due to said accelerator control rod being angled with respect to said brake control rod;

wherein said handle and said coupling member are generally coaxial and are positioned adjacent to a distal end of said tab such that said thumb control is positioned adjacent to said coupling end of said handle to facilitate the activation of the accelerator pedal;

said coupling member including a post portion and an annular portion, said post portion having a first end and a second end, said first end of said post portion being coupled to said inner surface of said tab of said second brake rod portion, said post portion of said coupling member being axially aligned with said handle;

said post portion of said coupling member having a length generally greater than a transverse cross section of said second brake rod portion taken substantially perpendicular to said longitudinal axis of said second brake rod portion;

said annular portion being mounted on said second end of said post portion, said aperture of said coupling member being centrally disposed in said annular portion;

a quick release coupling system for coupling said accelerator control rod to the accelerator pedal of the vehicle and for coupling said brake control rod to the brake pedal of the vehicle;

said quick release coupling system comprising a first coupling assembly for coupling said first accelerator rod portion of said accelerator control rod to the accelerator pedal of the vehicle and a second coupling assembly for coupling said first brake rod portion of said brake control rod to the brake pedal of the vehicle;

said first and second coupling assemblies including a first plate having upper and lower surfaces, said upper surface of said first plate having at least one tab formed thereon, said lower surface of said first plate being selectively abuttable against a first surface of the accelerator or brake pedal;

a second plate having upper and lower surfaces, said upper surface of said second plate being selectively abuttable against a second surface of the accelerator and brake pedals;

said first and second plates comprising a substantially rigid material;

a fastening means for operationally fastening said first plate to said second plate, said fastening means extending between and being coupled to said first and second plates;

said fastening means having a rod portion being mounted on said second plate, an end of said rod portion extending through said first plate;

said fastening means having a lever portion being pivotally mounted on an end of said rod portion of said fastening means, said lever portion being positioned generally adjacent to said first plate;

said lever portion of said fastening means being movable between a first position and a second position;

wherein said first position is characterized by a longitudinal axis of said lever being orientated generally perpendicular to said first plate;

wherein said second position is characterized by said longitudinal axis of said lever being orientated generally parallel to said first plate; wherein said first and second plates are generally closer to each other when said lever portion of said fastening means is in said first position than when said lever portion is in said second position;

said first and second plates being releaseably couplable to the accelerator and brake pedals of the vehicle when said lever portion is in said second position;

said second end of said first accelerator rod portion being pivotally coupled to said tab formed on said first plate of said first coupling assembly;

said second end of said first brake rod portion being pivotally coupled to said tab formed on said first plate of said second coupling assembly;

a securing means for securing said second ends of said first accelerator rod portion and said first brake rod portion to said tabs formed on said first plate of said first and second coupling assemblies, said securing means extending through said first end of said second end of said accelerator rod portion and said second end of said first brake rod portion and being removably secured to said tab formed on said first plate of said first and second coupling assemblies; and said securing means comprising a screw.

* * * * *